July 23, 1968  V. KUDELKA  3,393,871
HIGH TEMPERATURE FLAME SPRAYING PISTOLS
Filed Dec. 29, 1964  2 Sheets-Sheet 1

INVENTOR
Vitezslav Kudelka
BY Albert Jacobs
ATTORNEY

July 23, 1968  V. KUDELKA  3,393,871
HIGH TEMPERATURE FLAME SPRAYING PISTOLS
Filed Dec. 29, 1964  2 Sheets-Sheet 2

INVENTOR
Vitezslav Kudelka
BY Albert Jacobs
ATTORNEY

United States Patent Office 3,393,871
Patented July 23, 1968

3,393,871
HIGH TEMPERATURE FLAME SPRAYING PISTOLS
Vitezslav Kudelka, London, England, assignor to Berk Limited, London, England
Filed Dec. 29, 1964, Ser. No. 421,864
Claims priority, application Great Britain, Jan. 3, 1964, 376/64
2 Claims. (Cl. 239—79)

ABSTRACT OF THE DISCLOSURE

Materials may be flame sprayed, under pressure, through the use of a mixer unit in a flame spraying device which comprises a passage through which combustible gas is supplied, a passage through which the material to be sprayed is carried in a conveying gas, an additional passage for supplying combustible gas to the material supply passage and means for adjustably controlling the quantity of combustible gas supplied to the passage for the material to be sprayed.

---

This invention relates to the high temperature flame spraying of materials.

It is known to spray materials having high melting points, that is to say materials, such as metal powders, having melting points higher than 1,000° C., with the aid of flame spraying pistols to which the material to be sprayed is conveyed by a combustible gas such as acetylene gas. However, for reasons of safety, it has not been possible hitherto to supply the material to be sprayed to the pistol under pressure and it has not been possible to control the velocity at which the material is fed to the pistol and the quantity of material passing through the pistol independently of one another.

It is an object of the present invention to provide a way of overcoming these disadvantages.

According to one aspect of the invention, there is provided a method of flame spraying materials at high temperatures wherein the material to be sprayed is conveyed to a spray device in a non-combustible conveying gas, and a controllable quantity of a combustible gas is mixed with the stream of conveying gas and the material being conveyed before the stream emerges from the spray device.

According to another aspect of the invention, a flame spraying device has a mixer unit comprising a passage through which a combustible gas can be supplied, a passage through which material to be sprayed can be carried, in a conveying gas, an additional passage for supplying combustible gas to the pasage for the supply of material to be sprayed and means for adjustably controlling the quantity of combustible gas supplied to the passage for material to be sprayed.

The supply of combustible gas to the passage for the supply of material is preferably obtained by bleeding off some of the combustible gas in the passage for that gas and conveying it through a by-pass passage to a mixing chamber in the passage for the supply of material. In this case, the control means is located in the by-pass passage.

Figure 1:
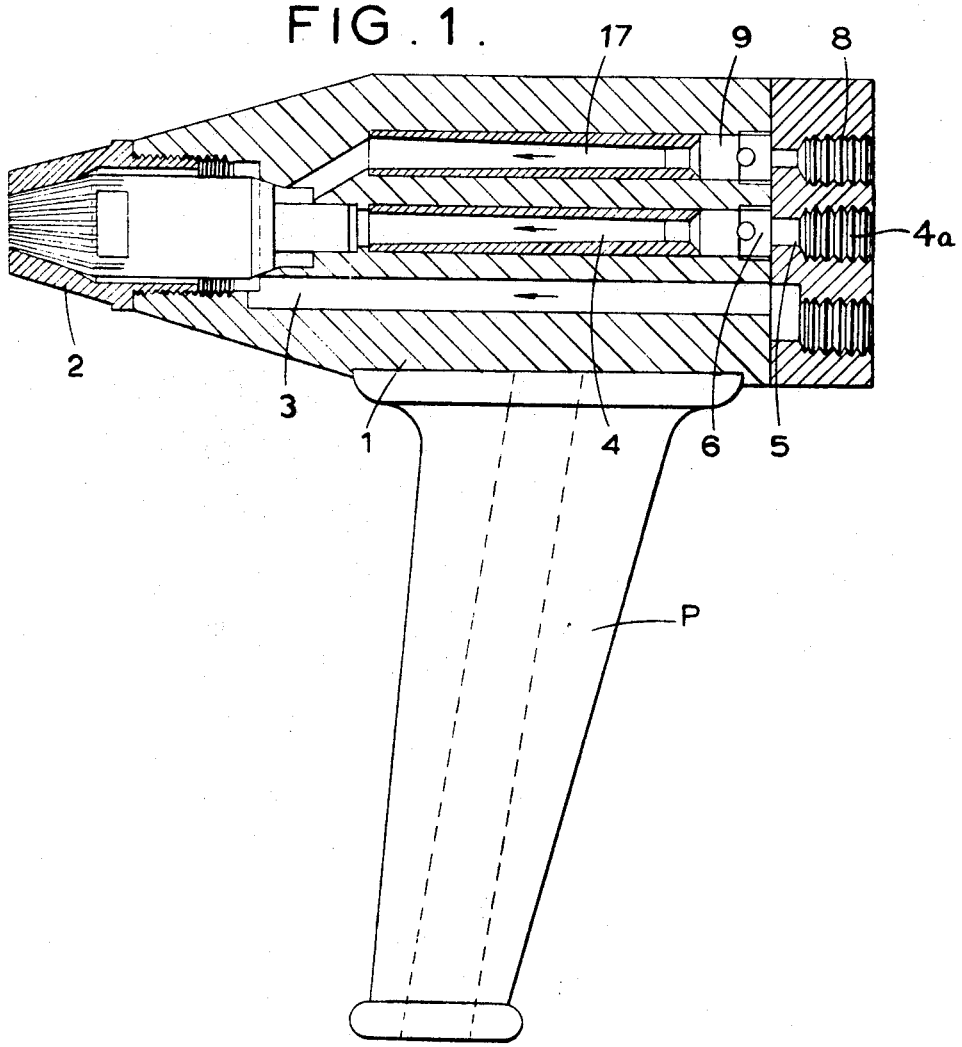
Figure 2:
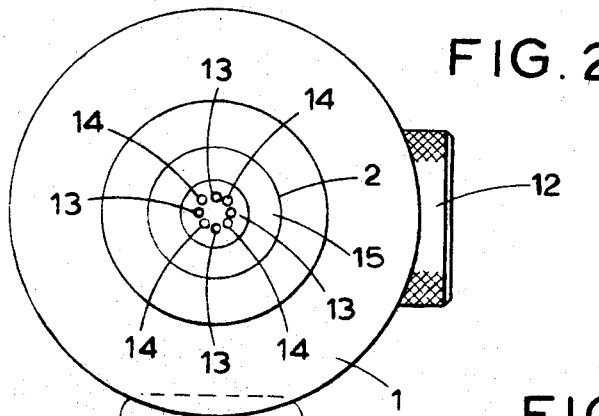
Figure 3:
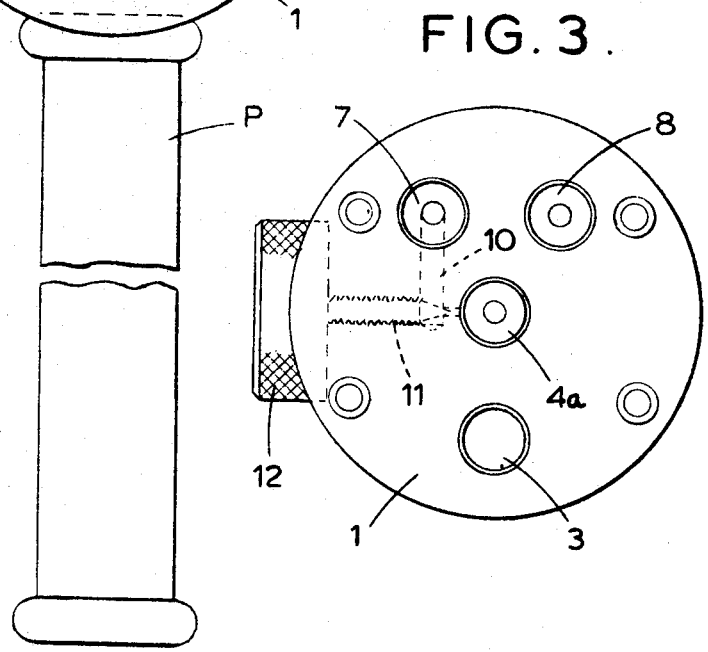

A flame spraying pistol according to the invention is illustrated in the accompanying drawings in which:
FIGURE 1 is a sectional diagram of the pistol,
FIGURE 2 is a front view, and
FIGURE 3 is a rear view.

According to the present invention, material to be sprayed, carried in a non-combustible gas, is mixed with a portion of the combustible gas before the stream of material and the conveying gas emerge from the pistol P. The pistol P includes a block 1 which serves to supply combustible gas, propelling gas and material to be sprayed to a nozzle 2 of the pistol. The block includes a main passage 3 for a propelling gas, which is conveniently air and passages 4a and 7. Passage 3 supplies propelling gas to nozzle 2. Passage 4 conveys non-combustible gas to the nozzle and passage 7 supplies combustible gas. Passage 4a conveys the material to be sprayed in powder form, in a stream of non-combustible gas called the conveying gas. This conveying gas is conveniently air, but can be an inert gas such as nitrogen. The mixture of powder and conveying gas is delivered to the passage 4 through a conduit 5 which opens into a mixing chamber 6 at the rear end of the passage 4.

Combustible gas, which is preferably acetylene, but can be coal gas or other combustible gas, is carried through the block 1 in a passage 7. A supply of oxygen is delivered to the passage 7 through a conduit 8 and is mixed with the combustible gas in a chamber 9.

A by-pass or bleed passage 10 extends between the chamber 6 and passage 7 to enable some of the combustible gas supplied to the chamber 9 to be bled off and conveyed to the mixing chamber 6 at the upstream end of passage 4. The quantity of combustible gas drawn through the by-pass passage 10 can be regulated as desired by means of a suitable control valve 11 in the passage 10. This valve has a knurled head 12 which can be rotated to adjust the setting of the valve.

The powder issuing from outlets 13 connected with the front of the conduit 4 meets the flame provided by the combustible gas issuing from outlets 14 connected with the front of the passage 7 and is propelled to the surface being sprayed by the propelling gas issuing from an outlet 15 connected with the front of the passage 3.

The advantages associated with the present invention are:

(1) The material to be sprayed can be pressure fed to the pistol without undue hazard since the amount of combustible gas in the conveying gas stream can be varied at will by means of the control valve 11;

(2) The speed of powder flow and the quantity of powder fed can be controlled independently of each other since the material can be pressure fed; and (3) The presence of combustible gas in the stream of material emerging from the nozzle avoids the cooling effect on the material being sprayed which occurs when the material is conveyed in a non-combustible gas alone.

Although the device described has only one passage for each of the two gases and the material to be sprayed it will be appreciated that additional passages can be provided if desired.

Some exmples of use of the invention are as follows:

EXAMPLE 1

A self-fluxing alloy for hard facing having a melting point of 1125° C. was flame sprayed to produce a coating of the alloy on ordinary mild steel. The alloy had the following composition, all parts being by weight.

| | Parts |
|---|---|
| Nickel | 13 |
| Cobalt | 45 |
| Chromium | 19 |
| Boron | 2.5 |
| Tungsten | 13 |
| Silicon | 3 |
| Carbon | 1 |

A throughput of from 8 to 11 lbs. per hour was obtained and efficiencies of spraying of up to 85% resulted.

EXAMPLE 2

A self-fluxing alloy for hard facing having a melting point of 1170° C. was flame sprayed onto ordinary mild steel, the composition of the alloy being as follows:

| | Parts |
|---|---|
| Nickel | 13 |
| Cobalt | 45 |
| Chromium | 19 |
| Boron | 1.5 |
| Tungsten | 8.0 |
| Silicon | 2.5 |
| Carbon | 1 |

Again a throughput of from 8 to 11 lbs. per hour was used and the efficiency of coating was about 85%.

EXAMPLE 3

A chrome steel alloy having a melting point of 1500° C. was flame sprayed onto ordinary mild steel, the composition of the alloy being as follows:

| | Parts |
|---|---|
| Chromium | 16 |
| Nickel | 2 |
| Carbon | 0.2 |
| Iron | 81.8 |

A throughput of 7 to 12 lbs. per hour was used and the efficiency of spraying was 83%.

In all three examples the calculated flame temperature was 3150° C.

What is claimed is:

1. In a flame spraying device, the improvement which comprises a mixer unit having a passage through which combustible gas can be supplied, a passage through which material to be sprayed can be carried in a conveying gas, an additional passage through which combustible gas can be supplied to said passage for the material to be sprayed, and means for adjustably controlling the quantity of combustible gas supplied to said passage for material.

2. A flame spraying apparatus comprising a spray device, a mixer unit having a first passage through which a propelling gas can be supplied to said device, a second passage through which combustible gas can be supplied to said device, a third passage between said first and sceond passages and through which matrial to be sprayed can be conveyed in a non-combustible conveying gas, said passage having a mixing chamber at an inlet end thereof, a supply conduit leading into said mixer chamber, a by-pass passage extending between said second and third passages and positoned to enable combustible gas to be bled off from said second passage and supplied to said mixing chamber, and an adjustable valve for controlling the quantity of combustible gas drawn through said by-pass passage.

References Cited

UNITED STATES PATENTS

| 2,125,764 | 8/1938 | Benoit | 239—79 |
| 2,544,259 | 3/1951 | Duccini et al. | 239—79 |
| 3,140,826 | 7/1964 | Kudelka | 239—79 |

FOREIGN PATENTS

| 652,571 | 11/1937 | Germany. |

EVERETT W. KIRBY, *Primary Examiner.*